United States Patent [19]
Cabrera Garcia

[11] Patent Number: 5,941,676
[45] Date of Patent: Aug. 24, 1999

[54] SELF-LOADING AND UNLOADING DEVICE, FOR CONTAINERS IN TRUCKS, TRAILERS, ARTICULATED VEHICLES AND THE LIKE

[76] Inventor: Guillermo Cabrera Garcia, Avda. Marítima Radazul "Edificio Botabara"-38109, El Rosario, Spain

[21] Appl. No.: 08/817,738
[22] PCT Filed: Aug. 20, 1996
[86] PCT No.: PCT/ES96/00161
  § 371 Date: May 12, 1997
  § 102(e) Date: May 12, 1997
[87] PCT Pub. No.: WO97/08014
  PCT Pub. Date: Mar. 6, 1997

[30] Foreign Application Priority Data

Aug. 23, 1995 [ES] Spain ................................ P 9501682
Jul. 5, 1996 [ES] Spain ................................ P 9601512

[51] Int. Cl.⁶ ...................................................... B60P 1/64
[52] U.S. Cl. .......................................... 414/500; 414/494
[58] Field of Search .................................. 414/491, 494, 414/498–500, 535, 528, 478, 479

[56] References Cited

U.S. PATENT DOCUMENTS

| | | | |
|---|---|---|---|
| 3,964,626 | 6/1976 | Arregui | 414/480 |
| 4,352,625 | 10/1982 | Bolderoff | 414/494 |
| 4,737,063 | 4/1988 | van den Pol | 414/500 X |
| 5,088,876 | 2/1992 | Lifflander | 414/494 X |
| 5,246,329 | 9/1993 | Farrell | 414/478 |
| 5,460,473 | 10/1995 | LaMora et al. | 414/494 |

FOREIGN PATENT DOCUMENTS

| | | |
|---|---|---|
| 282122 | 9/1988 | European Pat. Off. . |
| 2682336 | 4/1993 | France . |
| 1151044 | 5/1969 | United Kingdom . |
| 2105670 | 3/1983 | United Kingdom . |
| 91/12983 | 9/1991 | WIPO . |
| 92/06882 | 4/1992 | WIPO . |
| 93/12996 | 7/1993 | WIPO . |
| 95/11143 | 4/1995 | WIPO . |

*Primary Examiner*—David A. Bucci
*Attorney, Agent, or Firm*—Klauber & Jackson

[57] ABSTRACT

The device comprises a horizontal shaft (1) which is connected to a coupling head (2) at the lower front angles of the container (3), through conventional pins (4). The axis or shaft remains anchored through a traction cable or chain (8), and is driven by way of telescopic hydraulic cylinders (9) situated along the rocking body or in the cradle of the trailer. The traction cable or chain passes over various return-pulleys and remains anchored at its extremities to respective fixing points of the chassis. The axis or shaft (1) has fixed extremities, a central movable portion and a pair of intermediate rollers (13) bearing on the rolling tracks (21) of the cradle or rocking chassis (10). There are also provided small wheels (18) which are situated on the other side of the rolling tracks. The container (3) bears posteriorly on a table of rollers (25) and optionally on a pair of side rows of rollers which are displaceable vertically through the action of hydraulic cylinders.

16 Claims, 9 Drawing Sheets

SELF-LOADING AND UNLOADING DEVICE, FOR CONTAINERS IN TRUCKS, TRAILERS, ARTICULATED VEHICLES AND THE LIKE

OBJECT OF THE INVENTION

As expressed in the statement of this Specification, the present invention refers to a self-loading and unloading device for containers in trucks, trailers, articulated vehicles and the like, by which notable relevant and advantageous characteristics are offered in relation to the devices currently in existance for this purpose and which are of their own type.

The loading of the container is intended on anchorage of a coupling head on the lower front part of the container, conducting this operation without hindrance and in such a manner that said container is self-centered without having to overcome any type of step, on the contrary, performing the loading operation with complete smoothness and a minimum of effort from the traction device.

With this device, the "ISO" containers may be mounted on trucks, trailers, or articulated vehicles of any type, homologated for transport on roads or for services in harbor and railway terminals, as also in transportation centers, industries, plants and the like. This self-loading and unloading device may be also used in the interior of ships, ferries or rolons, etc.

BACKGROUND OF THE INVENTION

At present, there is in existance a loading and unloading device for containers, in which each one of the same must carry the corresponding additional frame, making the maneuvering enormously difficult, also being very expensive and entailing an excessive volume during storage keeping a minimum stock of said frames.

Another type of current loading devices does not require said additional frames, providing however, a complex structure for enabling the loading and unloading, since the side members of the rocking body carry telescopic elements and a series of levers and various axes which in short, create stresses, breaking of cables, etc. The connection of the container to the coupling head of the traction device is also complicated, making the assembly difficult to the operator.

In cases when on initiating the loading of the container, chafing, slips and wearing is produced apart from the breakage of the cables a solution is not given. It is necessary to center the vehicle with sufficient accuracy as regards the container to be loaded, so that the maneuver is conducted with satisfaction. Also, when extending the telescopic elements, it is necessary to elevate hydraulic elements on the posterior extremity, suspending the container so as not to create friction when losing the seating angle of the container in the rocking chassis.

DESCRIPTION OF THE INVENTION

In general lines, the self-loading and unloading device for containers on trucks, trailers, articulated vehicles and the like, which constitute the object of the invention, eliminates the previously indicated problems since it provides a robust structure which is at the same time extremely simple, performing different functions in an optimum manner on one single axis, versus the one on conventional systems which require different axis and levers. As may be seen hereto, the actual guide pulleys for commencement of the raising of the container easily produce the self-centering of the same.

It has been provided that in accordance with the invention, when the container loses the bearing angle on the angled cradle or rocking chassis, a rolling bearing platform elevates, so that the same slides easily with the traction of the coupling head.

The provision of a horizontal axis or shaft which is to be found connected to a coupling head at the lower front angles of the container, by means of traditional pins may be quoted as a basic functional characteristic of the proposed device. This coupling head naturally corresponds to the type of container used.

The central part of this horizontal shaft or axis may rotate freely as regards the ends of the coupling head when a coaxial axis passes through the same, being inserted on both sides of said central part of the axis, various of the rollers intended for bearing on the bands or rolling tracks provided to that effect on the angled cradle or rocking chassis, depending on the type of trailer used, to define the sliding means of the container on the front zone of the same.

The shaft or axis remains suspended from its central moveable portion from traction cables or chains, passing over various return-pulleys assembled on the extremities of a posteriorly fixed axis on the rocking chassis or angled cradle, both branches also passing over front pulleys assembled on an axis which may be displaced parallel to itself when it becomes solid part of the extremities of stems of various telescopic hydraulic cylinders located under the platform, being finally anchored to the ends of said branches at respective posterior fixed points.

In a preferred embodiment, the central free turning section of said shaft or axis, is equipped with a pair of equal radial orifices which inter-communicate internally making provision for the assembly by means of a coaxial tubular axis, provided in turn with another pair of orifices confronted to those of the shaft. The traction cable or chain may thus be only one entering through one of the radial orifices and exiting through the other, both branches passing over the return-pulleys. Thus the cable or chain works more advantageously by compensating the stresses on one and another branch.

According to the invention, the incorporation of small wheels have also been provided, which are parallel to the intermediate rollers on the rolling track of the rocking chassis or angled cradle, each mounted on eccentric parts inserted on the axis immediately after said rollers or immediately before the same. These small wheels are intended to be placed on the other side of the wings which define the double "T" profiles which preferably make up said rolling tracks, thus preventing accidental undesired elevation of the container, since it cancels its angle of attack or seat on the bearing surface.

Precisely when the container loses this bearing angle, the elevation of a central table of rollers has been provided, preferably constituted by a continuous band arranged on a plurality of moveable wheels mounted on intermediate parallel axis, remaining situated at quincunxes in order to minimize the distance between axis, and so that the pressure on said axes be minimum. This continuous band is arranged on a floating frame related to the rocking chassis or angled cradle through vertical hydraulic cylinders.

Optionally, and in its case, due to the structure of the base of the container used, the existance of two rows of side rollers may be required, which collaborate to optimize the smooth sliding of the container until the loading of the same is ended. These rows of side rollers each remain arranged on elevational and liftable "U" shaped profiles by means of vertical hydraulic cylinders anchored to the chassis or cradle.

It has also been provided that the rear part of the rocking chassis or cradle of the trailer, be equipped with an articulated support which carries an intermediate roller on the floor, correctly located by means of a hydraulic cylinder.

In another embodiment, it has been provided that the branches of the chains or traction cables, reach, before passing over the corresponding pulleys pertaining to the rear fixed axis of the rocking chassis or angled cradle, respective pulleys which are found arranged on a fixed, front axis, connected in like manner to the rear axis, anchoring the ends of these branches to respective barrels which simultaneously rotate, around a common axis, activated by a capstan.

The capstan and corresponding winding barrels are preferably found situated on the rear part of the actual chassis, though they could also be situated in another location below the sliding surface of the container.

To make more comprehensible the characteristics of the invention, and forming integral part of this Specification, sheets of drawings are enclosed, in the figure of which, the following have been represented with illustrative non limitative character.

DESCRIPTION OF THE PREFERRED EMBODIMENT

With reference to the numbering adopted in the figures, it can be observed how the self-loading and unloading device for containers in trucks, trailers, articulated vehicles and the like, proposed by the invention, are basically equipped with a horizontal shaft or axis, generally referenced as number 1 and is connected to the coupling head 2 for anchorage to container 3 by means of pins 4 (see FIG. 6) inserted through orifices 5 and 6. Orifice 6 diametrically cross extremities 7 of the shaft or axis 1.

The horizontal axis or shaft 1 is suspended from the traction cables or chains, referenced as number 8, anchored to a pair of hydraulic cylinders 9 located in the angled cradle or rocking chassis 10 of the truck, trailer, articulated vehicle or the like.

Figure 3:
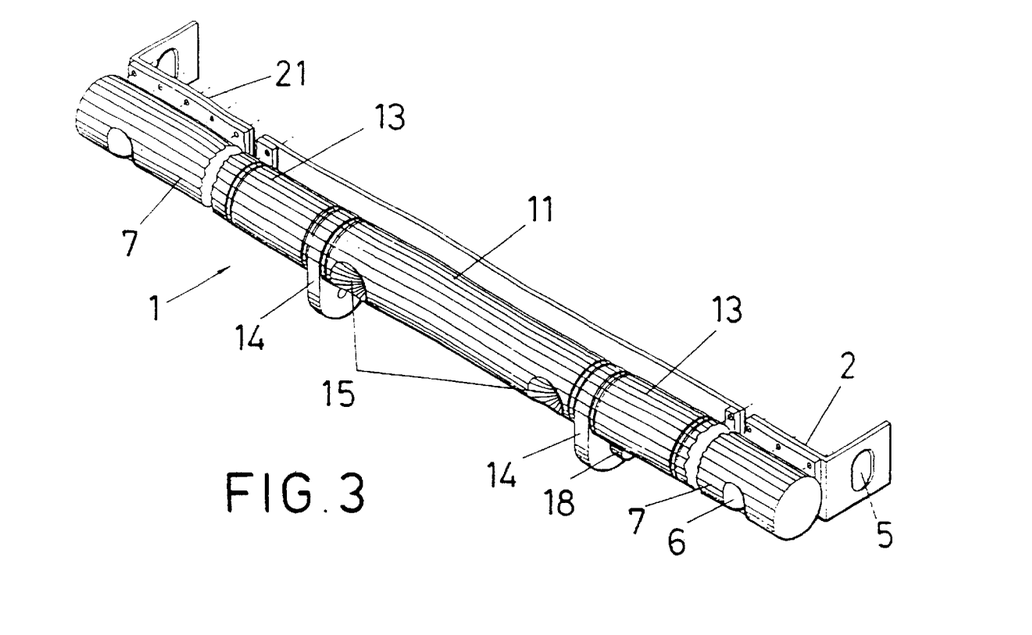
FIG. 3 is a perspective view of the horizontal shaft or axis connected to the coupling head to the container.
Figure 4:
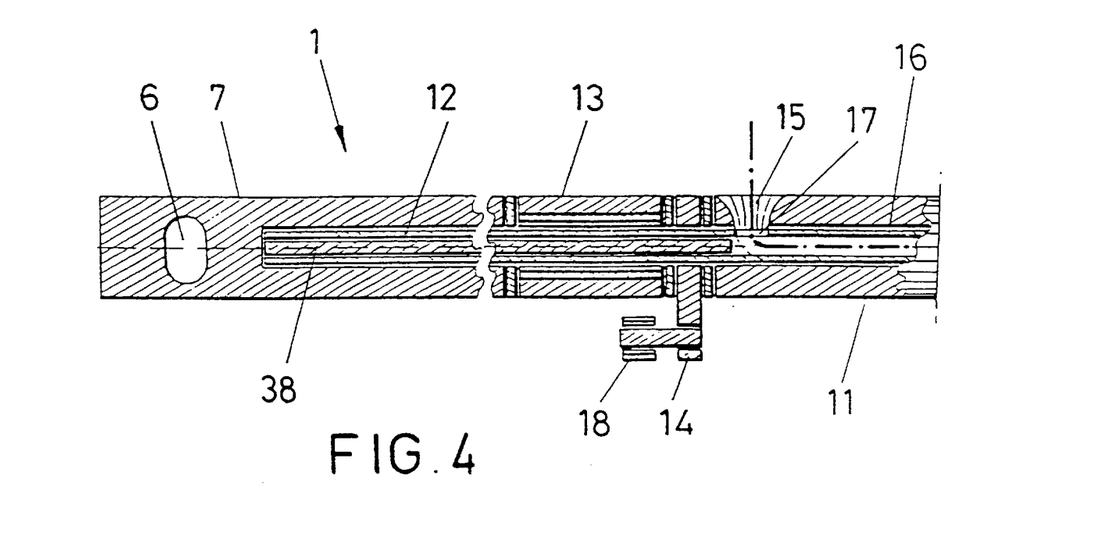
FIG. 4 is a partial longitudinal section of the same shaft or axis of FIG. 3.

With special reference to FIG. 3 and 4, the structure of shaft or axis 1 can be observed, constituted by two previously indicated end portions 7, and a central portion 11 of greater length and which is capable of free rotating as regards the former, all of them being crossed by the coaxial tubular axis 12, inserting a roller 13 between each side of said portions 7 and 11, as well as an eccentric adjacent part 14.

The central portion 11 of the shaft or axis 1 is equipped with two radial orifices 15 near its extremities and which communicate internally through the axial pitch 16 of the tubular axis 12, since the latter is provided with other such orifices 17 in facing positions.

The eccentric parts 14 may oscillate freely around the coaxial axis 12 and each carry wheels 18 which are parallel to the respective roller 13.

Figure 5:
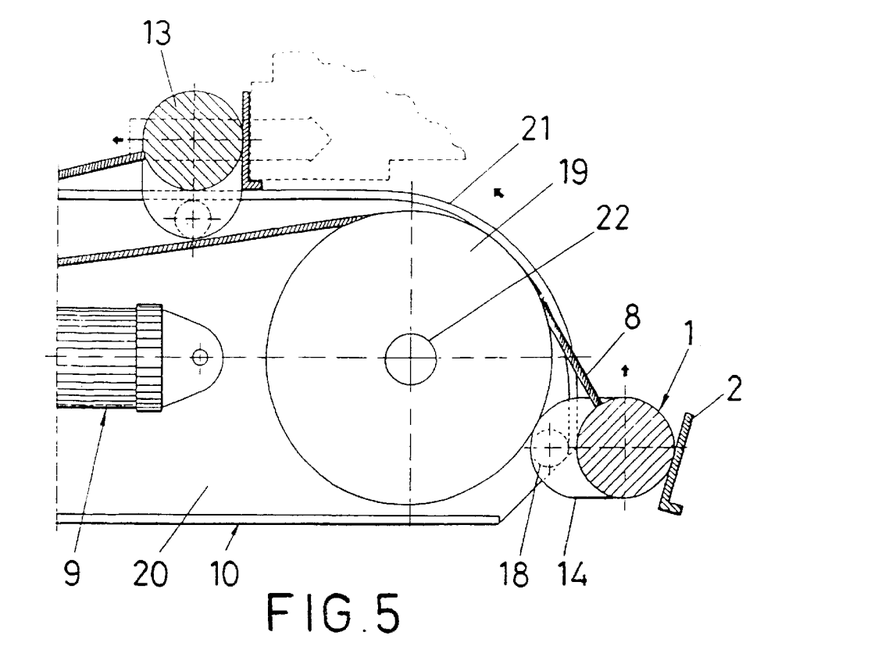
FIG. 5 is a longitudinal elevational sectional view, which shows the rear part of the rocking chassis or angled cradle of the articulated vehicle, precisely where the return-pulleys of the traction cables or chains are to be found.

The shaft or axis 1, once connected to container 3, is pulled by the branches of cable 8 driven by the telescopic hydraulic cylinder 9, passing cable 8 through different pairs of return-pulleys, the rear-most one of which is referenced as number 19 in FIG. 5. Analyzing this FIG. 5, it can be observed that when shaft 1 is elevated and contacts the side members 20 of the rocking chassis or angled cradle 10, it does so precisely on the upper wings of its double "T" profile which extends backwards with arched shape, thus materializing the rolling track 21 for the respective intermediate roller 13 of shaft 1. In this FIG. 5, now under consideration, it can be observed how shaft 1 may pass from the lower right position of this figure to the upper left when pulled by the cables 8, rolling over this track 21 and in such a manner that the wheels 18 of the eccentric parts 14 are situated on the other side of the wings of said rolling track 21, as safety element, to prevent overturning, as indicated at the commencement of this specification.

Figure 6:
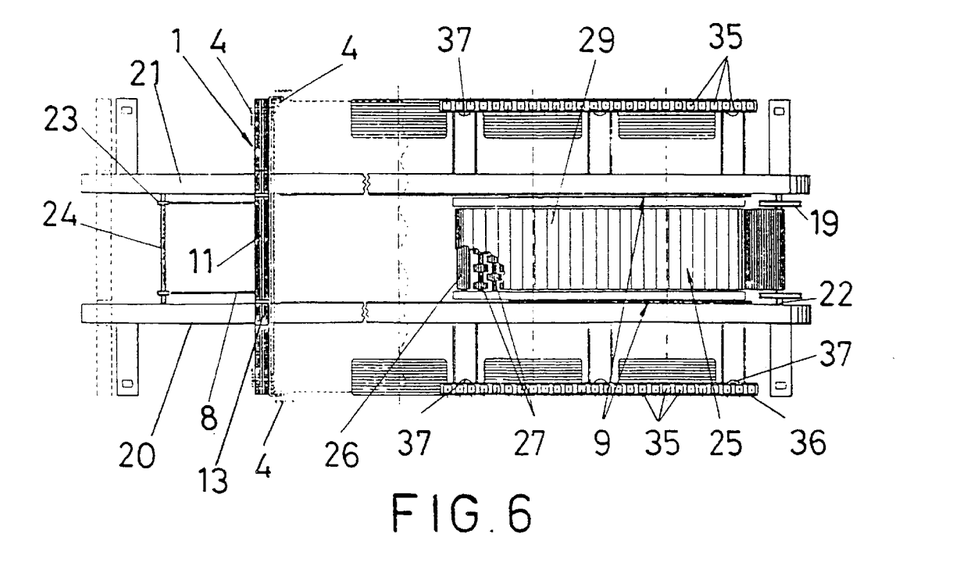
FIG. 6 is a plan view of an articulated vehicle which includes the self-loading and unloading device for containers, according to the invention.
Figure 7:
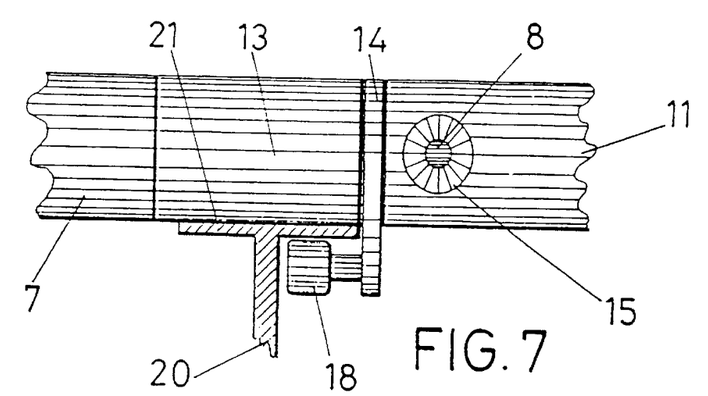
FIG. 7 is a partial view of the horizontal shaft or axis, on the zone where one of the intermediate rollers on the rolling band of the angled cradle or rocking chassis, is to be found.
Figure 12:
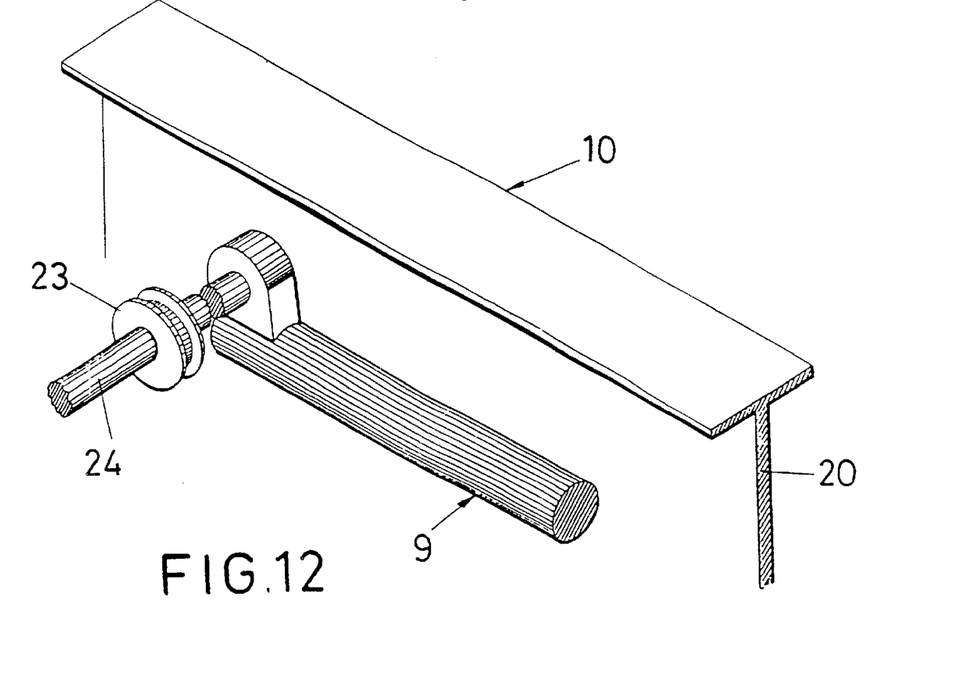
FIG. 12 is a partial perspective view of one of the stems of the telescopic cylinders for activating the cables or traction chains, also representing its relative position as regards the side members of the rocking chassis or angled cradle of the trailer or articulated vehicle.
Figure 13:
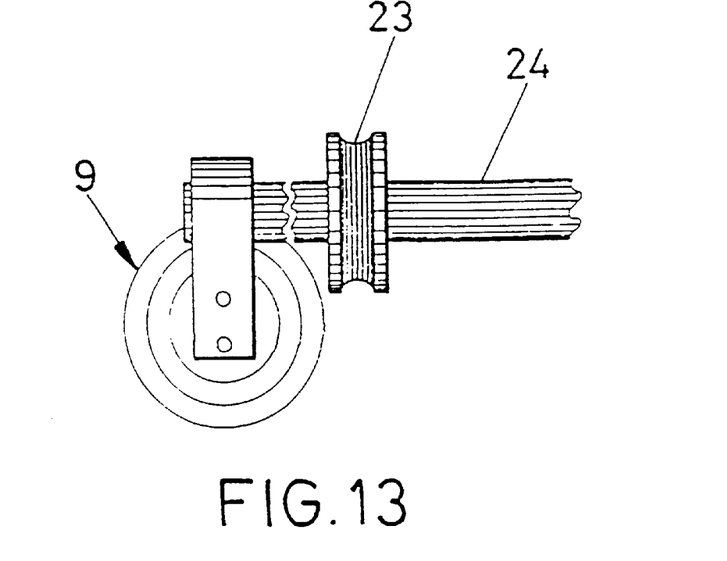
FIG. 13 is a front elevational view of FIG. 12 representation.
Figure 14:
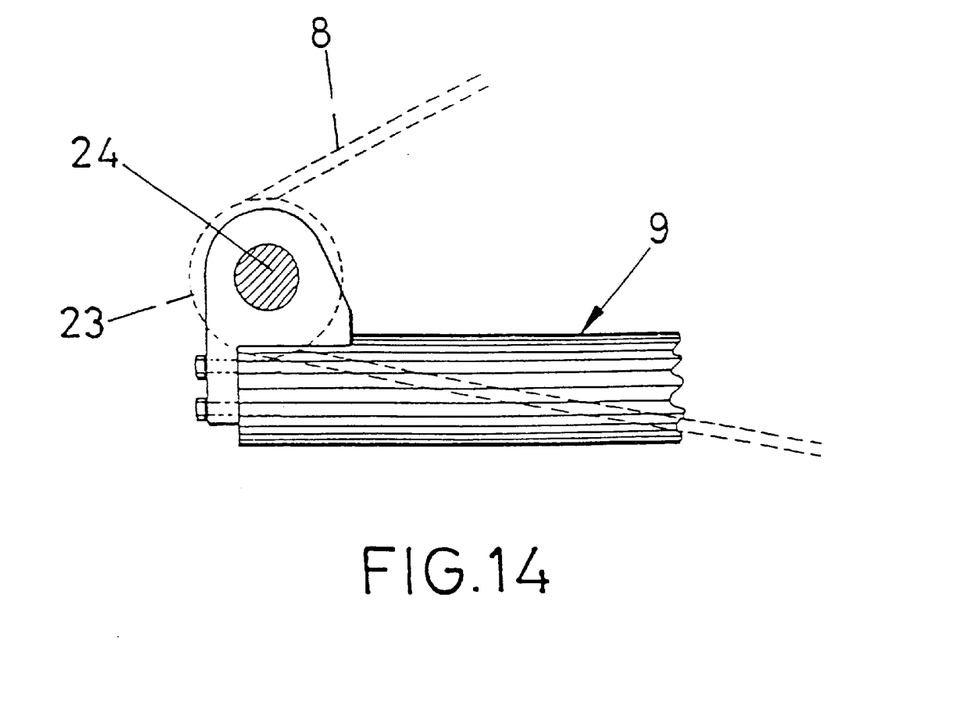
FIG. 14 is a side view of FIG. 13, showing by means of discontinuous lines, the pulleys and traction cables.

Observing now FIG. 6, it can be seen that on the right-hand side of the same the return-pulleys 19 are to be found, assembled on the rear axis 22 fixed to chassis 10. The respective branches of cable 8 continue until they reach the return-pulleys 23 assembled on the front axis 24 which is moveable since it is capable of parallel displacement by the effect of the hydraulic cylinder 9, remaining connected to the paired extremities of their stems, as can be seen in greater scale in figure 12 to 14. The free extremities of the cable 8 branches after passing over the front pulleys 23, remain anchored to respective fixed points of the chassis. Thus, when the shaft or axis 1 is near the floor connected by means of the coupling head 2 to container 3, when driven by the telescopic cylinder 9 for extension of their stems, said shaft 1 may occupy the front position of the rolling tracks of the chassis, in the position shown in FIG. 1, precisely because during the extension of the cylinders, the pulled length of the cable is double that of the stroke effected by the cylinder. The possibility is also considered of increasing the number of branches, depending on the characteristics of the traction cylinders and mainly, on their strokes, coupling other pairs of moveable pulleys to form a burton.

Figure 8:
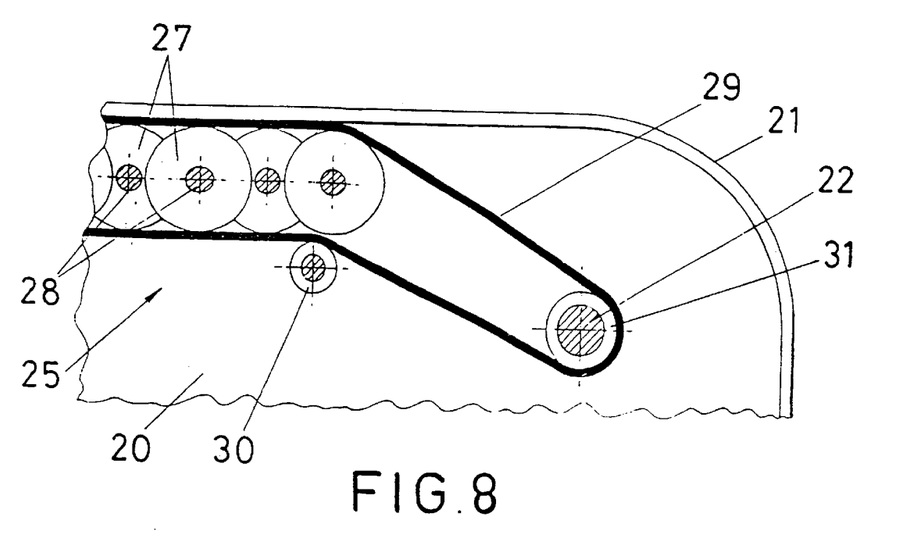
FIG. 8 is a partial longitudinal elevational view of the table of rollers with continuous band for the central bearing of the container.
Figure 9:
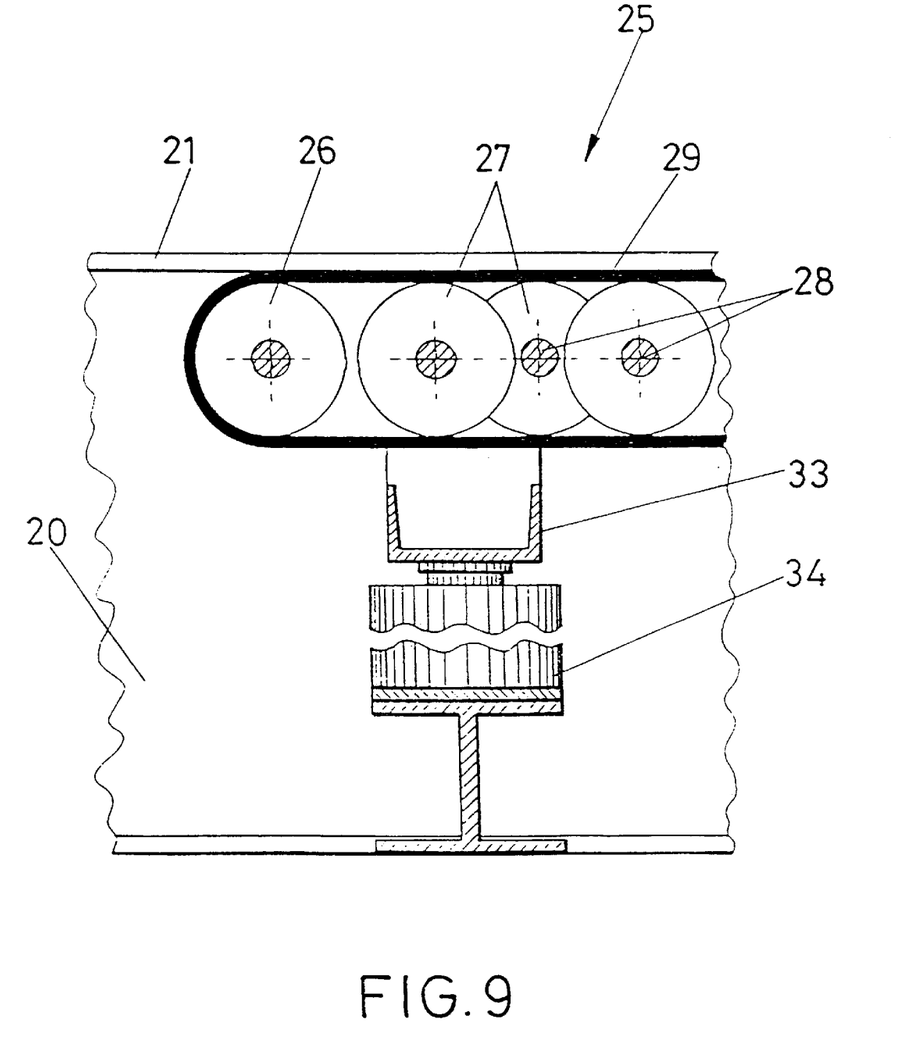
FIG. 9 is a similar view to FIG. 8, of the front zone of the same table of rollers, where one of the elevational cylinders of the same is to be found located.

In FIG. 6, generally referenced as number 25 is the table of rollers on which container 3 bears as from the moment in which the same loses the angle of attack with the rocking chassis or cradle 10, smoothing the last stage of the load until it reaches the final position in which it shall remain blocked. In FIG. 8 and 9, have been represented in greater scale, the structure of said table of rollers 25. The same is constituted by means of a front roller 26, and a plurality of moveable wheels 27 arranged at quincunxes in parallel axes 28. Roller 26 and wheels 27 are covered by continuous band 29 which optimizes the sliding of container 3. Reference 30 of FIG. 8 shows a return-pulley of the tensing branch of continuous band 29, after passing over rear roller 31 assembled in this case, on the actual posterior axis 22 of the return-pulleys 19 of traction cable 8.

Figure 10:
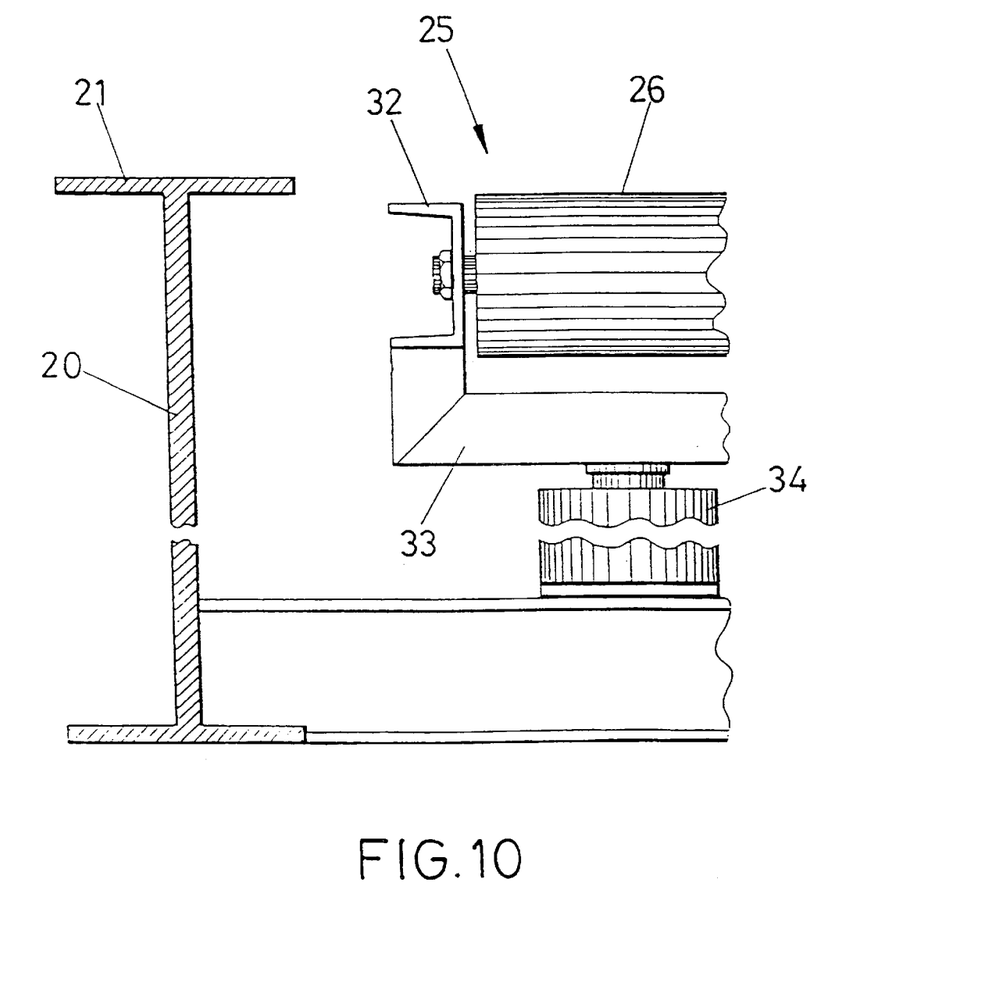
FIG. 10 is a lateral view of FIG. 9 representation.

The table of rollers 25 bears in floating manner on a pair of longitudinal backstays 32 (FIG. 10) made solid by crosspieces 33 to determine a frame which is vertically displaced by means of hydraulic cylinder 34 (see FIG. 9 and 10).

Figure 11:
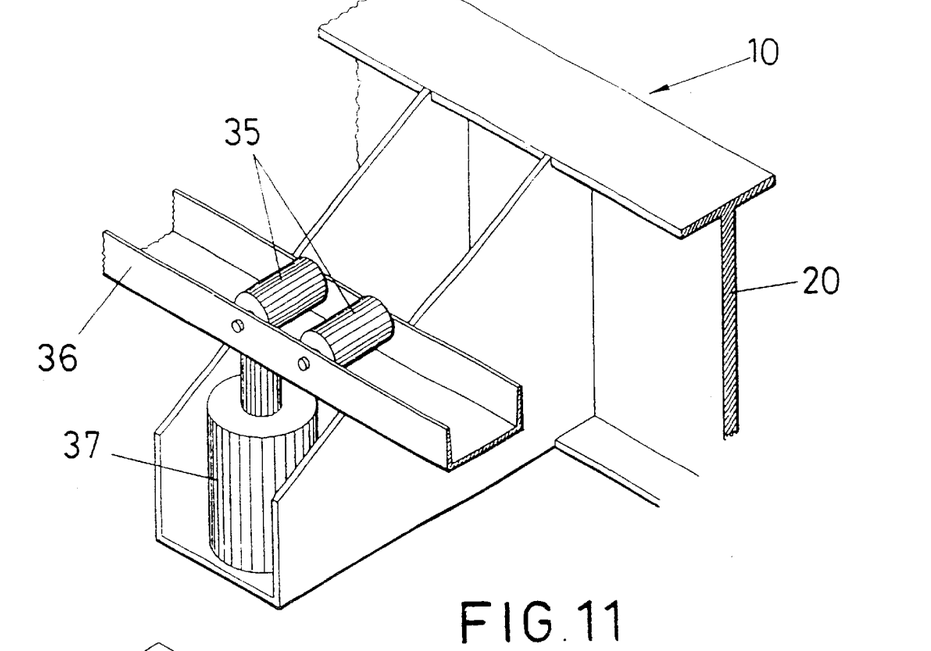
FIG. 11 is a partial perspective view of one of the side supports which may additionally carry the rocking chassis or angled cradle to optimize the sliding of the container.

As previously indicated, container 3, besides bearing on the continuous band 29 centrally to the chassis or cradle 10, may also bear on the side rows of roller 35, assembled on parallel axes bearing on each of the wings of the "U" profiles 36, such as is shown in FIG. 6 and 11. Profiles 36 are elevated when their operation is required, by means of hydraulic cylinders 37 vertically bearing on the cradle or chassis 10.

Making reference once again to FIG. 4, it must also be pointed out that reference 38 designates a rod or solid axis which may be mounted if required, in the axial hollow of tubular axis 12, at one and the other end of the same, to increase the bearing strength. The central part of the axial hollow of this tubular axis 12, must be remembered as being occupied by the traction cable 8 which exits through the radial orifices 15 with rounded edges so as not to damage the cable.

Figure 1:
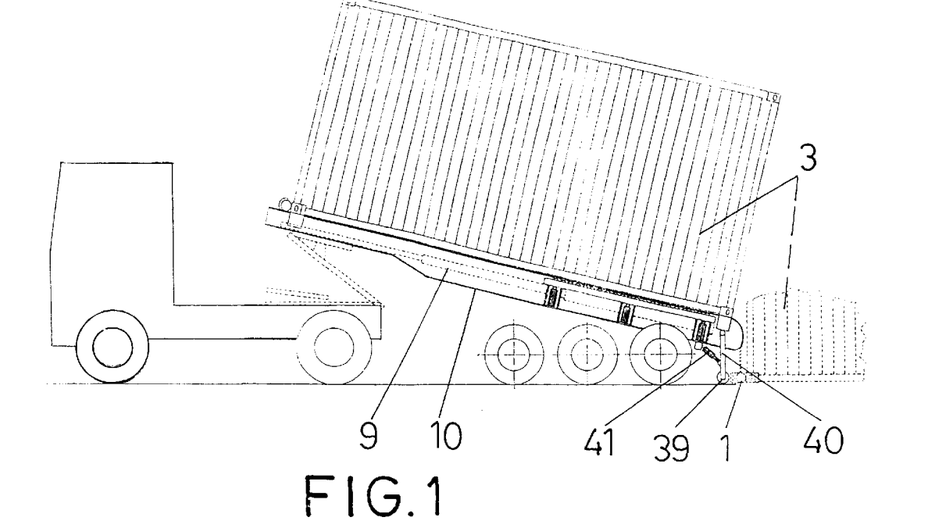
FIG. 1 is a schematic longitudinal elevational view of an articulated vehicle with angled cradle, when the trailer bears on the seat or fifth wheel of the tractor, said vehicle being equipped with the self-loading and unloading device for containers, according to the invention.
Figure 2:
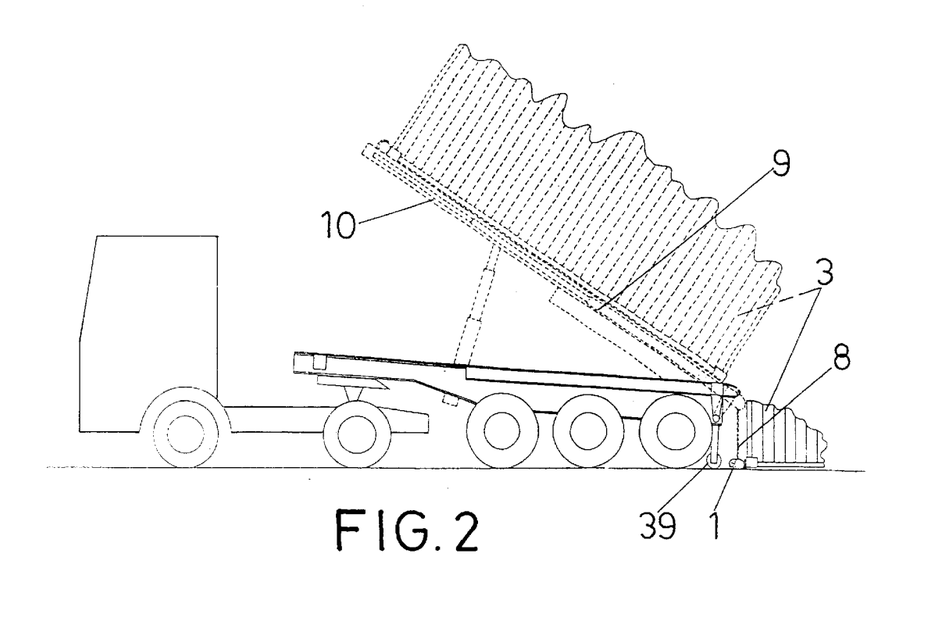
FIG. 2 is a similar view to FIG. 1, showing in this case, a standard articulated vehicle provided with a rocking chassis, being similarly equipped with a self-loading and unloading device for containers according to the invention.

FIG. 1 and 2 show, referenced with number 39, the intermediate roller on the floor, which prevents that the posterior part of the chassis or cradle of the trailer may give way during the loading of the container. Support 40 of roller 39 is displaced at an angle driven by the hydraulic cylinder 41.

Figure 15:
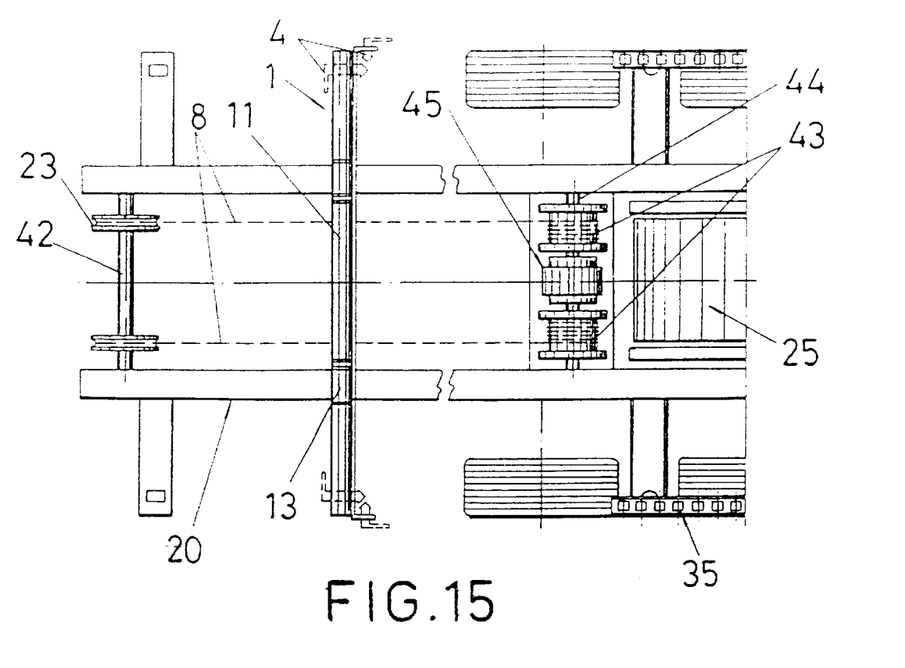
FIG. 15 is a partial plan view of the self-loading and unloading device incorporated to a vehicle which is partially shown, including the traction system by a capstan.
Figure 16:
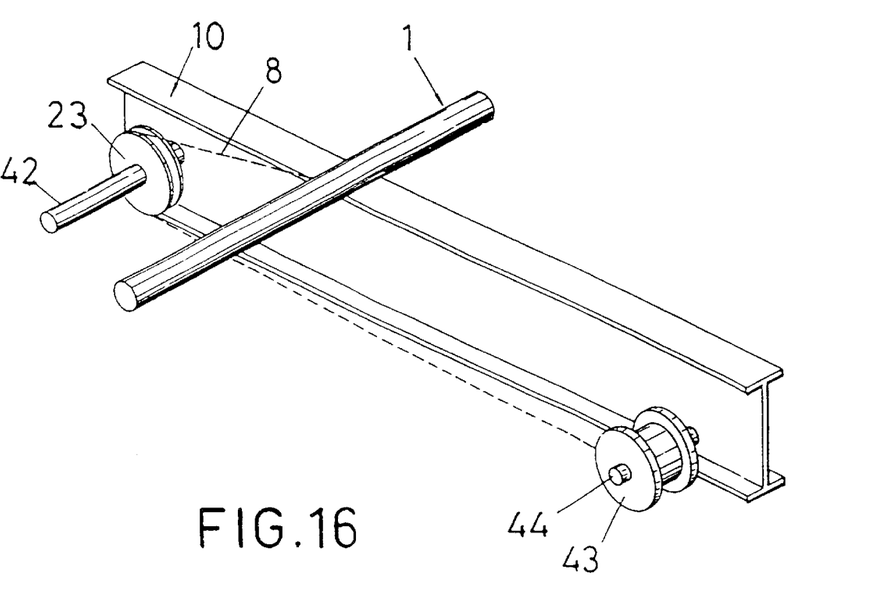
FIG. 16 is an exploded perspective view, similar to FIG. 12 representation, but including the traction system by a capstan.

With special reference now to FIG. 15 and 16, the traction system by capstan of the structure may be observed. The traction cables 8, as from their connection to the horizontal axis or shaft 1, and pass over the respective return-pulleys 23 though in this case are mounted on the fixed axis 42 of the rocking chassis or angled cradle 10 of the articulated vehicle, remaining finally wound on the barrels 43 around axis 44, driven by the capstan 45.

I claim:

1. Self-loading and unloading device, for containers in vehicles, said device comprising:

a horizontal shaft, connected to a coupling head whereby said coupling head is arranged to be connected to lower front angles of a container by way of pins, said horizontal shaft having a free central part, on which branches of at least one traction cable or chain are anchored, the horizontal shaft having two extremities which are fixed to the coupling head; wherein the central part of the horizontal shaft is arranged rotatably with regard to the extremities of the horizontal shaft, around a coaxial shaft which passes between said extremities of the horizontal shaft, through said central part; the horizontal shaft including two intermediate rollers for bearing on respective rolling tracks arranged on an angled cradle or rocking chassis, said rollers facilitating sliding of the horizontal shaft over said rolling tracks, each one of said intermediate rollers being inserted between one of said extremities of the horizontal shaft and said central part; the branches passing over return-pulleys anchored to a rear transversal fixed shaft, wherein adjacent to each one of said intermediate rollers, there is an eccentric piece which is arranged to pivot freely around the coaxial shaft, whereby each eccentric piece carries, at an exterior point thereof, a shaft with a wheel arranged parallel to a corresponding adjacent intermediate roller, a space being provided between said wheel and said corresponding adjacent intermediate roller, said space being sufficient for housing a wing of a rolling track.

2. Device according to claim 1, in which the rolling tracks correspond to upper wings of a "double T" profile.

3. Device according to claim 1, in which the rolling tracks start according to a vertical section which joins in arched manner with a rest of the rolling tracks, making possible that the intermediate rollers of the horizontal shaft (1) bear on a lower extremity of the corresponding rolling tracks after starting a loading maneuver of the container, and that the wheels adjacent to the intermediate rollers are placed behind wings which define said rolling tracks, to prevent accidental undesired lifting of the container.

4. Device according to claim 1, in which a table of rollers has been provided which is arranged to support the container during a final stage of the loading, to facilitate its sliding.

5. Device according to claim 4, in which the table of rollers consists of a continuous band extended between a pair of end rollers and a plurality of moveable wheels arranged at intermediate parallel shafts and at quincunxes, to minimize the distance between said shafts; all the shafts of the table of rollers, with the advantageous exception of a posterior shaft which is fixed and coincident with a shaft of the return-pulleys, being extended between a pair of longitudinal backstays made solid by way of welded crosspieces to define a floating frame related with the rocking chassis or angled cradle through vertical hydraulic cylinders.

6. Device according to claim 5, in which said container may also additionally bear on two rows of side rollers, provided with shafts which are mounted between wings of "U" profiles which are capable of elevation and lifting by way of vertical hydraulic cylinders, anchored to said chassis or cradle.

7. Device according to claim 1, in which a rear part of the chassis or cradle, includes an articulated support, which carriers an intermediate roller arranged to provide support on the ground, when driven against the ground by a hydraulic cylinder.

8. Device according to claim 1, which additionally includes front return-pulleys assembled on a front shaft which may be displaced parallel to itself, being extended between respective supports which are made solid to the stems of a pair of side telescopic hydraulic cylinders situated throughout a length of said rocking chassis or on said cradle, the extremities of both branches of the traction cable or chain being finally anchored at rear fixed points of said chassis or cradle.

9. Device according to claim 1, in which said branches of said traction cables or chains, additionally pass over various front return-pulleys mounted on a fixed shaft of the front part of said rocking chassis or said cradle, finally winding on barrels around a shaft driven by a capstan.

10. Self-loading and unloading device, for containers in vehicles, said device comprising: a horizontal shaft, connected to a coupling head whereby said coupling head is arranged to be connected to lower front angles of a container by way of pins, said horizontal shaft having a free central part, on which branches of at least one traction cable or chain are anchored, the horizontal shaft having two extremities which are fixed to the coupling head; wherein the central part of the horizontal shaft is arranged rotatably with regard to the extremities of the horizontal shaft, around a coaxial shaft which passes between said extremities of the horizontal shaft, through said central part; the horizontal shaft including two intermediate rollers for bearing on respective rolling tracks arranged on an angled cradle or rocking chassis, said rollers facilitating sliding of the horizontal shaft over said rolling tracks, each one of said intermediate rollers being inserted between one of said extremities of the horizontal shaft and said central part; the branches passing over return-pulleys anchored to a rear transversal fixed shaft; wherein the horizontal shaft is provided at its central part with radial orifices inter-communicated through the coaxial shaft, the walls of said coaxial shaft including orifices facing the orifices of the central part of the horizontal shaft, in order that a single traction cable or chain can pass through said orifices and through said coaxial shaft.

11. Device according to claim 10, in which said radial orifices are open in conical manner so as to offer blunt edges when contacting with the branches of the traction cable or chain.

12. Device according to claim 10, which additionally includes front return-pulleys assembled on a front shaft which may be displaced parallel to itself, being extended between respective supports which are made solid to the stems of a pair of side telescopic hydraulic cylinders situated throughout a length of said rocking chassis or on said cradle, the extremities of both branches of the traction cable or chain being finally anchored at rear fixed points of said chassis or cradle.

13. Device according to claim 10, in which said branches of said traction cables or chains, additionally pass over various front return-pulleys mounted on a fixed shaft of the front part of said rocking chassis or said cradle, finally winding on barrels around a shaft driven by a capstan.

14. Self-loading and unloading device, for containers in vehicles, said device comprising:

a horizontal shaft, connected to a coupling head whereby said coupling head is arranged to be connected to lower front angles of a container by way of pins, said horizontal shaft having a free central part, on which branches of at least one traction cable or chain are anchored, the horizontal shaft having two extremities which are fixed to the coupling head; wherein the central part of the horizontal shaft is arranged rotatably with regard to the extremities of the horizontal shaft, around a coaxial shaft which passes between said extremities of the horizontal shaft, through said central part; the horizontal shaft including two intermediate rollers for bearing on respective rolling tracks arranged on an angled cradle or rocking chassis, said rollers facilitating sliding of the horizontal shaft over said rolling tracks, each one of said intermediate rollers being inserted between one of said extremities of the horizontal shaft and said central part; the branches passing over return-pulleys anchored to a rear transversal fixed shaft;

wherein a table of rollers has been provided which is arranged to support the container during a final stage of the loading, to facilitate its sliding;

wherein the table of rollers consists of a continuous band extended between a pair of end rollers and a plurality of moveable wheels arranged at intermediate parallel shafts and at quincunxes, to minimize the distance between said shafts; all the shafts of the table of rollers, with the advantageous exception of a posterior shaft which is fixed and coincident with a shaft of the return-pulleys, being extended between a pair of longitudinal backstays made solid by way of welded crosspieces to define a floating frame related with the rocking chassis or angled cradle through vertical hydraulic cylinders; and wherein said container may also additionally bear on two rows of side rollers, provided with shafts which are mounted between wings of "U" profiles which are capable of elevation and lifting by way of vertical hydraulic cylinders, anchored to the chassis or cradle.

15. Device according to claim 14, which additionally includes front return-pulleys assembled on a front shaft which may be displaced parallel to itself, being extended between respective supports which are made solid to the stems of a pair of side telescopic hydraulic cylinders situated throughout a length of said rocking chassis or on said cradle, the extremities of both branches of the traction cable or chain being finally anchored at rear fixed points of said chassis or cradle.

16. Device according to claim 14, in which said branches of said traction cables or chains, additionally pass over various front return-pulleys mounted on a fixed shaft of the front part of said rocking chassis or said cradle, finally winding on barrels around a shaft driven by a capstan.

* * * * *